US012635612B2

(12) United States Patent
Bittner et al.

(10) Patent No.:  US 12,635,612 B2
(45) Date of Patent:  May 26, 2026

(54) FLUTED ROTOR

(71) Applicant: CNH Industrial America LLC, New
Holland, PA (US)

(72) Inventors: Roy Bittner, Reedsville, WI (US);
Kenneth Bittner, Haubstadt, IN (US)

(73) Assignee: CNH Industrial America LLC, New
Holland, PA (US)

( * ) Notice: Subject to any disclaimer, the term of this
patent is extended or adjusted under 35
U.S.C. 154(b) by 371 days.

(21) Appl. No.: 18/372,972

(22) Filed: Sep. 26, 2023

(65) Prior Publication Data

US 2025/0098590 A1       Mar. 27, 2025

(51) Int. Cl.
*A01F 7/06*        (2006.01)
*A01F 12/10*       (2006.01)
*A01F 12/18*       (2006.01)

(52) U.S. Cl.
CPC ................ *A01F 7/06* (2013.01); *A01F 7/067*
(2013.01); *A01F 12/10* (2013.01); *A01F 12/18*
(2013.01)

(58) Field of Classification Search
CPC ... A01F 7/00–7/70; A01F 12/00–12/60; A01F
7/06; A01F 7/067; A01F 12/10; A01F
12/18; A01D 7/00–7/70; A01D
12/00–12/60
See application file for complete search history.

(56) References Cited

U.S. PATENT DOCUMENTS

| | | | | |
|---|---|---|---|---|
| 4,178,943 | A | * 12/1979 | West | A01F 7/06 |
| | | | | 460/80 |
| 4,422,463 | A | * 12/1983 | West | A01F 7/06 |
| | | | | 460/71 |
| 5,556,337 | A | 9/1996 | Tophinke et al. | |
| 6,296,566 | B1 | 10/2001 | Tanis et al. | |
| 6,830,512 | B2 | * 12/2004 | Tanis | A01F 7/06 |
| | | | | 460/68 |
| 11,147,213 | B2 | 10/2021 | Kemmerer et al. | |

(Continued)

FOREIGN PATENT DOCUMENTS

| | | |
|---|---|---|
| CN | 114514828 A | 5/2022 |
| EP | 3473079 A1 | 4/2019 |

(Continued)

*Primary Examiner* — Joseph M Rocca
*Assistant Examiner* — Madeline I Runco
(74) *Attorney, Agent, or Firm* — Buchanan Ingersoll &
Rooney PC

(57)        ABSTRACT

An agricultural thresher rotor comprising: a main body
extending along a rotation axis in a processing direction
from a front main body end to a rear main body end; a rotor
transition surface extending from the front main body end
and tapered to decrease in cross-sectional size, as viewed
along the rotation axis, away from the main body; and at
least one impeller extending away from the rotation axis
from the rotor transition surface, and configured to move
crop material towards the main body upon rotation of the
rotor about the rotation axis. The rotor transition surface and
the main body comprise at least one flute located down-
stream of the at least one impeller, and defining a recessed
flute volume in the rotor transition surface and the main
body. An agricultural thresher including a rotor, and an
agricultural combine including the thresher are also pro-
vided.

14 Claims, 7 Drawing Sheets

(56) References Cited

U.S. PATENT DOCUMENTS

| | | | |
|---|---|---|---|
| 2009/0143123 A1* | 6/2009 | Pope | A01F 7/067 |
| | | | 460/69 |
| 2013/0337876 A1* | 12/2013 | Johnson | A01F 12/10 |
| | | | 460/149 |

FOREIGN PATENT DOCUMENTS

| | | |
|---|---|---|
| GB | 2015855 B | 5/1982 |
| WO | 2014070397 A1 | 5/2014 |

* cited by examiner

FLUTED ROTOR

FIELD OF THE INVENTION

This patent application relates to agricultural threshing and separating equipment.

BACKGROUND OF THE INVENTION

An agricultural harvester such as a combine harvester or "combine" is an integrated machine that performs multiple harvesting functions, such as picking, threshing, separating and cleaning. A combine typically includes a header, which removes the crop from a field, and a feeder housing which transports the crop matter into a threshing and separating system. The threshing system includes one or more rotors that extend along respective rotation axes within the body of the combine. The rotors are partially or fully surrounded by a perforated concave. The crop material is threshed and separated by the rotation of the rotor within the concave. The separated grain and non-grain material then proceeds for further processing to collect the desired grain.

A typical rotor has a generally cylindrical main body, a tapered inlet body, and one or more helical impellers at the inlet body. The rotor is mounted to rotate about the cylindrical axis of the main body. A housing transition cone surrounds the forward end of the rotor, and provides a funnel of sorts to direct the crop material along the impellers and to the main body. As the rotor turns, the impellers pull the crop material backwards into the transition cone and then into the main threshing chamber defined between the main body of the rotor and the concaves.

It has been found that grain material can become overly compressed as the crop mat moves in the processing direction between the converging tapered inlet body and the diverging tapered inlet body of the rotor. When this happens, the power requirement for the rotor can increase and the crop material can become clotted or clumped, and the threshing efficiency can decrease. An attempt apparently has been made to address this problem by forming the rotor main body with a small-diameter cylindrical forward portion adjacent to the impeller and tapered inlet body, and a large-diameter portion rearward of the small-diameter portion. The principle of this design seems to be that the grain will not immediately compress, or compress less rapidly, as it moves along the small-diameter cylindrical region. However, this design could lead to relatively inefficient threshing and separating due to the relatively large space formed between the small-diameter cylindrical region and the concaves, and can lead to increased pressure at the transition between the small- and large-diameter portions, which can require additional structure along the length of the concaves or cage to adequately handle that increased pressure.

The inventors have determined that improvements can be made to conventional threshing and separating systems.

This description of the background is provided to assist with an understanding of the following explanations of exemplary embodiments, and is not an admission that any or all of this background information is necessarily prior art.

SUMMARY OF THE INVENTION

In one exemplary aspect, there is provided an agricultural thresher rotor comprising: a main body extending along a rotation axis in a processing direction from a front main body end to a rear main body end; a rotor transition surface extending from the front main body end and tapered to decrease in cross-sectional size, as viewed along the rotation axis, away from the main body; and at least one impeller extending away from the rotation axis from the rotor transition surface, and configured to move crop material towards the main body upon rotation of the rotor about the rotation axis. The rotor transition surface and the main body comprise at least one flute located downstream of the at least one impeller, and defining a recessed flute volume in the rotor transition surface and the main body.

In another exemplary aspect, there is provided an agricultural thresher comprising: a rotor cage having a rotor cage inlet; and a rotor mounted within the rotor cage and configured to rotate relative to the rotor cage about a rotation axis. The rotor comprises: a main body extending along the rotation axis in a processing direction from a front main body end to a rear main body end, wherein the main body is located inside the rotor cage and the main body and the rotor cage define a threshing chamber; a rotor transition surface extending from the front main body end and tapered to decrease in cross-sectional size away from the main body; and at least one impeller extending away from the rotation axis from the rotor transition surface, and configured to move crop material towards the rotor cage inlet and the main body upon rotation of the rotor about the rotation axis. The rotor transition surface and the main body comprise at least one flute located downstream of the at least one impeller, and defining a recessed flute volume in the rotor transition surface and the main body.

In another exemplary aspect, there is provided an agricultural combine comprising: a chassis configured for movement along a surface; a feeder housing; and thresher. The thresher comprises: a rotor cage having a rotor cage inlet in communication with the feeder housing; and a rotor mounted within the rotor cage and configured to rotate relative to the rotor cage about a rotation axis. The rotor comprises: a main body extending along the rotation axis in a processing direction from a front main body end to a rear main body end, wherein the main body is located inside the rotor cage and the main body and the rotor cage define a threshing chamber; a rotor transition surface extending from the front main body end and tapered to decrease in cross-sectional size away from the main body; and at least one impeller extending away from the rotation axis from the rotor transition surface, and configured to move crop material from the feeder housing towards the rotor cage inlet and the main body upon rotation of the rotor about the rotation axis. The rotor transition surface and the main body comprise at least one flute located downstream of the at least one impeller, and defining a recessed flute volume in the rotor transition surface and the main body.

BRIEF DESCRIPTION OF THE DRAWINGS

Embodiments of inventions will now be described, strictly by way of example, with reference to the accompanying drawings, in which.

In the figures, like reference numerals refer to the same or similar elements.

DETAILED DESCRIPTION OF THE DRAWINGS

Terms of relative orientation and movement, such as "forward," "rearward," "left," and "right," "downstream" and "upstream," are used herein to facilitate explanations of the structures described herein, and are not intended to be construed as limiting.

Figure 1A:
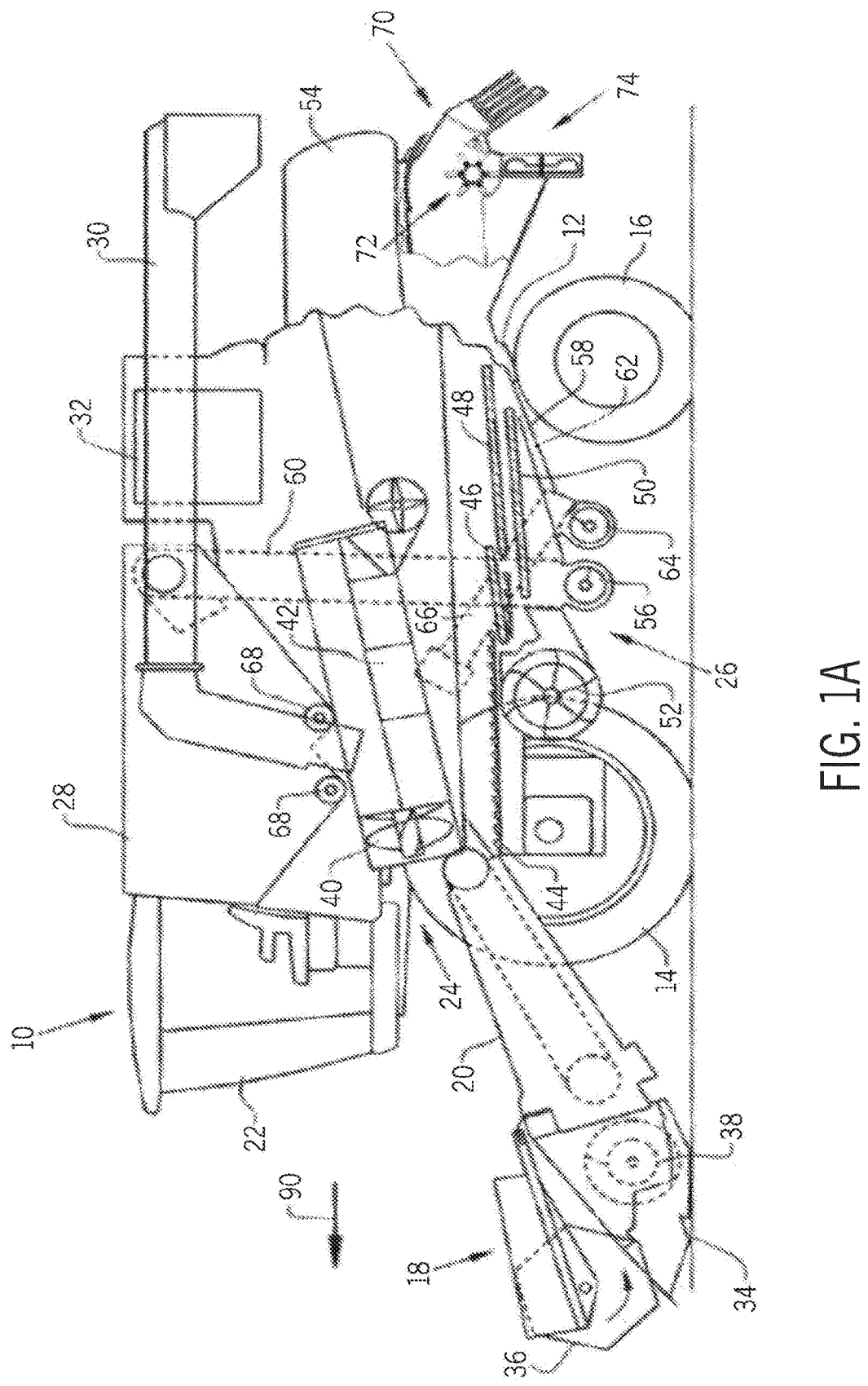
FIG. 1A illustrates an agricultural combine having a threshing and separating system according to exemplary embodiments described herein.

FIG. 1A shows an agricultural harvester in the form of a combine 10, which may be used with embodiments of the invention. The combine 10 includes a chassis 12, ground engaging wheels 14, 16, a header 18, a feeder housing 20, an operator cab 22, a threshing and separating system or assembly 24, a cleaning system 26, a grain tank 28, and an unloading tube or conveyor 30. Unloading conveyor 30 is illustrated as an unloading auger, but can also be configured as a belt conveyor, chain elevator, etc.

The front wheels 14 are large flotation-type wheels, and the rear wheels 16 are smaller steerable wheels. Motive force is selectively applied to the front wheels 14 through a power source in the form of a diesel engine 32 and a transmission (not shown). Although the combine 10 is shown as including pneumatic tires, wheels may be tracked wheels, as in a full tracks or half-tracks vehicle.

The header 18 is mounted to the front of the combine 10 and includes a cutter bar 34 for severing crops from a field during forward motion of the combine 10. A rotatable reel 36 feeds the crop into the header 18, and a double auger 38 feeds the severed crop laterally inwardly from each side toward the feeder housing 20. The feeder housing 20 conveys the cut crop to the threshing and separating system 24, and is selectively vertically movable using appropriate actuators, such as hydraulic cylinders (not shown).

The threshing and separating system 24 is of the axial-flow type, and generally includes a rotor 40 at least partially enclosed by and rotatable inside a corresponding perforated concave 42. The cut crops are threshed and separated by the rotation of the rotor 40 within the concave 42, and larger elements, such as stalks, leaves and the like are discharged from the rear of the combine 10. Smaller elements of crop material including grain and non-grain crop material, including particles lighter than grain, such as chaff, dust and straw, are discharged through perforations of the concave 42.

Grain that has been separated by the threshing and separating system 24 falls onto a grain pan 44 and is conveyed toward the cleaning system 26. The cleaning system 26 may include an optional pre-cleaning sieve 46, an upper sieve 48 (also known as a chaffer sieve), a lower sieve 50 (also known as a cleaning sieve), and a cleaning fan 52. Grain on the sieves 46, 48, 50 is subjected to a cleaning action by the fan, which provides an airflow through the sieves, to remove chaff and other impurities such as dust from the grain by making this material airborne for discharge from the straw hood 54 of the combine 10. The grain pan 44 and the pre-cleaning sieve 46 oscillate in a fore-aft direction to transport the grain and finer non-grain crop material to the upper surface of the upper sieve 48. The upper sieve 48 and the lower sieve 50 are vertically arranged relative to each other, and likewise oscillate in a fore-aft direction to spread the grain across the sieves 48, 50 while permitting the passage of cleaned grain by gravity through the openings of the sieves 48, 50.

Clean grain falls to a clean grain auger 56 positioned crosswise below and in front of the lower sieve 50. The clean grain auger 50 receives clean grain from each sieve 48, 50 and from the bottom pan 58 of the cleaning system 26. The clean grain auger 56 conveys the clean grain laterally to a generally vertically arranged grain elevator 60 for transport to the grain tank 28. Tailings from the cleaning system 26 fall to a tailings auger trough 62. The tailings are transported via the tailings auger 64 and the return auger 66 to the upstream end of the cleaning system 26 for repeated cleaning action. The cross augers 68 at the bottom of the grain tank 28 convey the clean grain within the grain tank 28 to the unloading auger 30 for discharge from the combine 10.

A residue handling system 70 is integrated in the rear of the combine 10. For example, a chopper arrangement 72 is mounted to a straw hood 54 of the combine 10, and is located above a vertically-oriented straw and chaff spreader 74. The residue handling system receives material other than grain (MOG) after grain has been removed by the threshing and separating system 24 and discharges the MOG across the harvested width behind the combine 10.

Figure 1B:
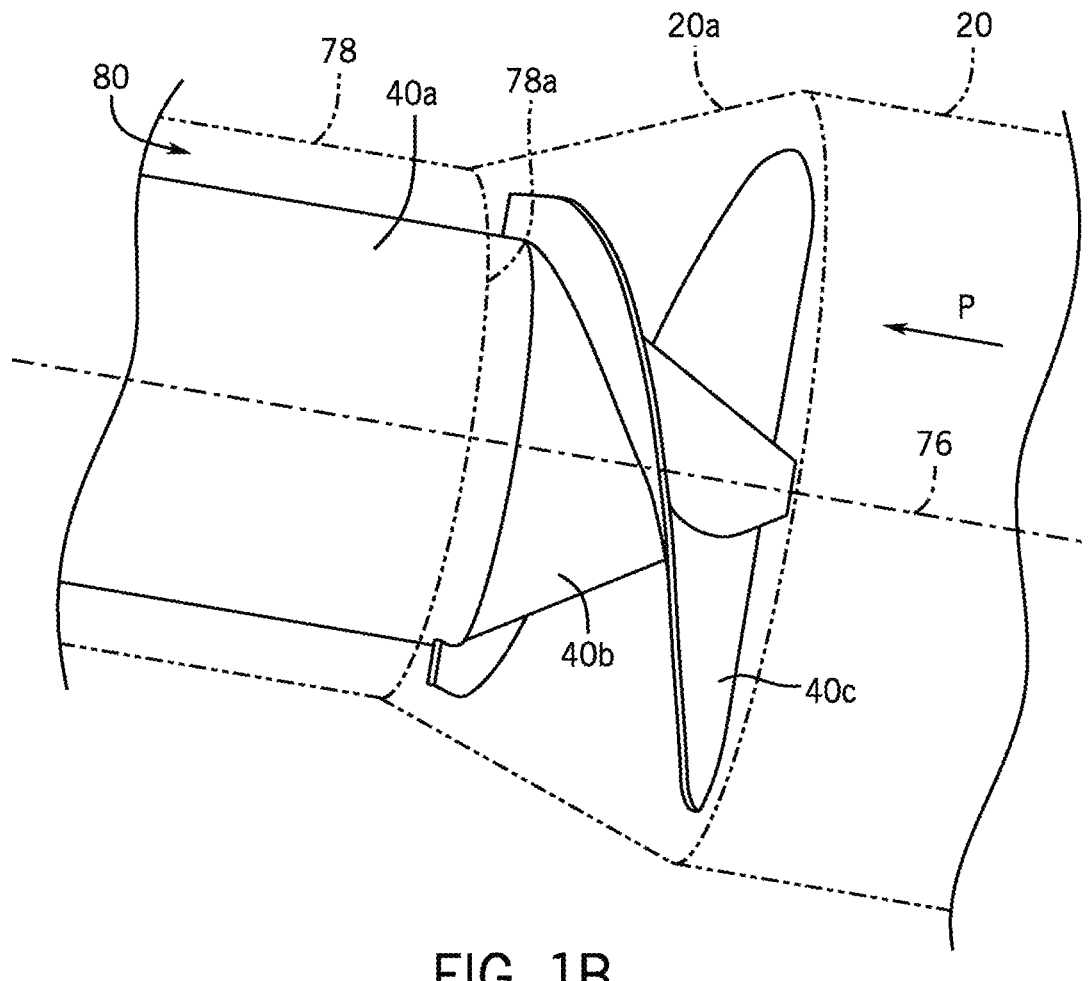
FIG. 1B is an isometric view of a prior art thresher rotor.
Figure 2A:
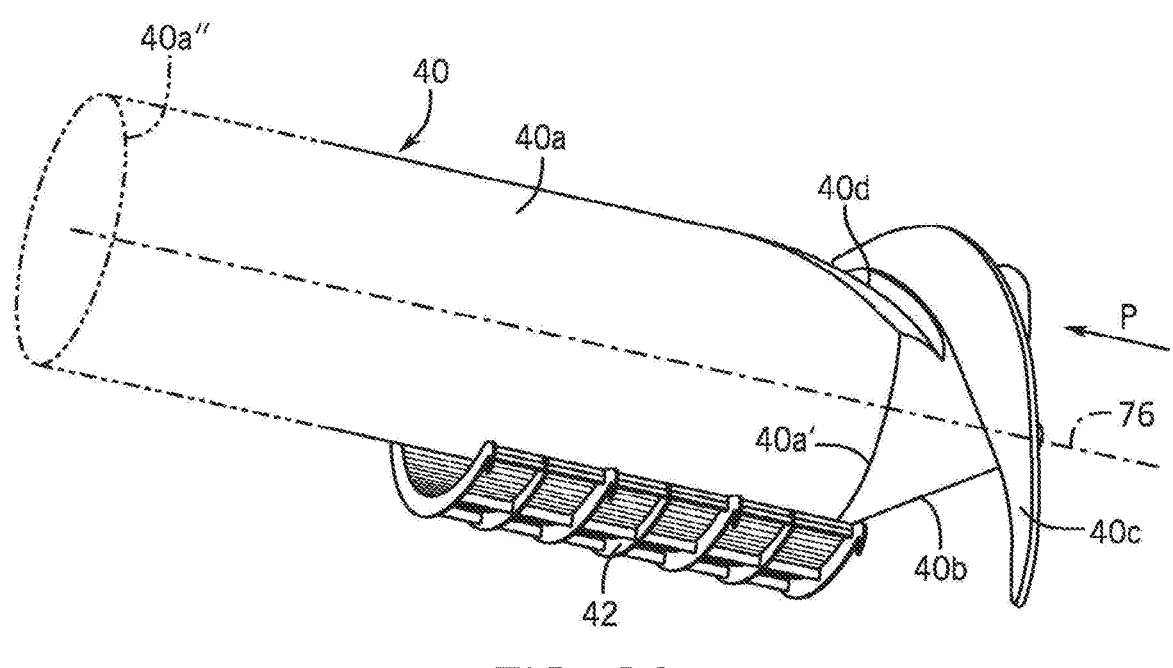
FIGS. 2A-2D are isometric views of an exemplary thresher rotor, shown in four different rotational positions.
Figure 2B:
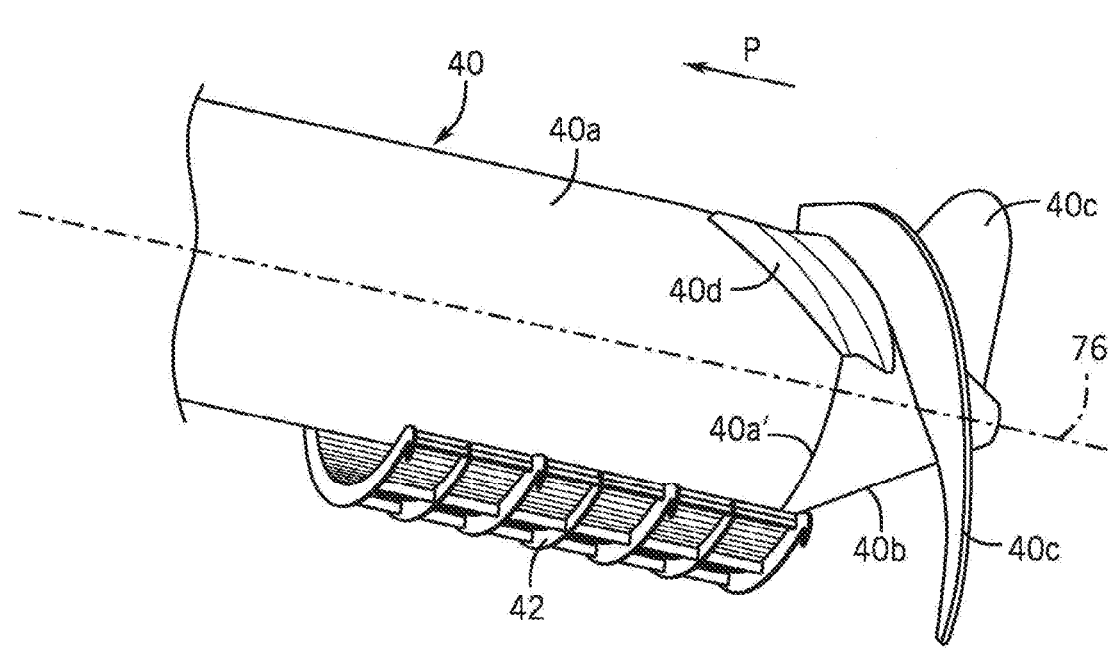
Figure 2C:
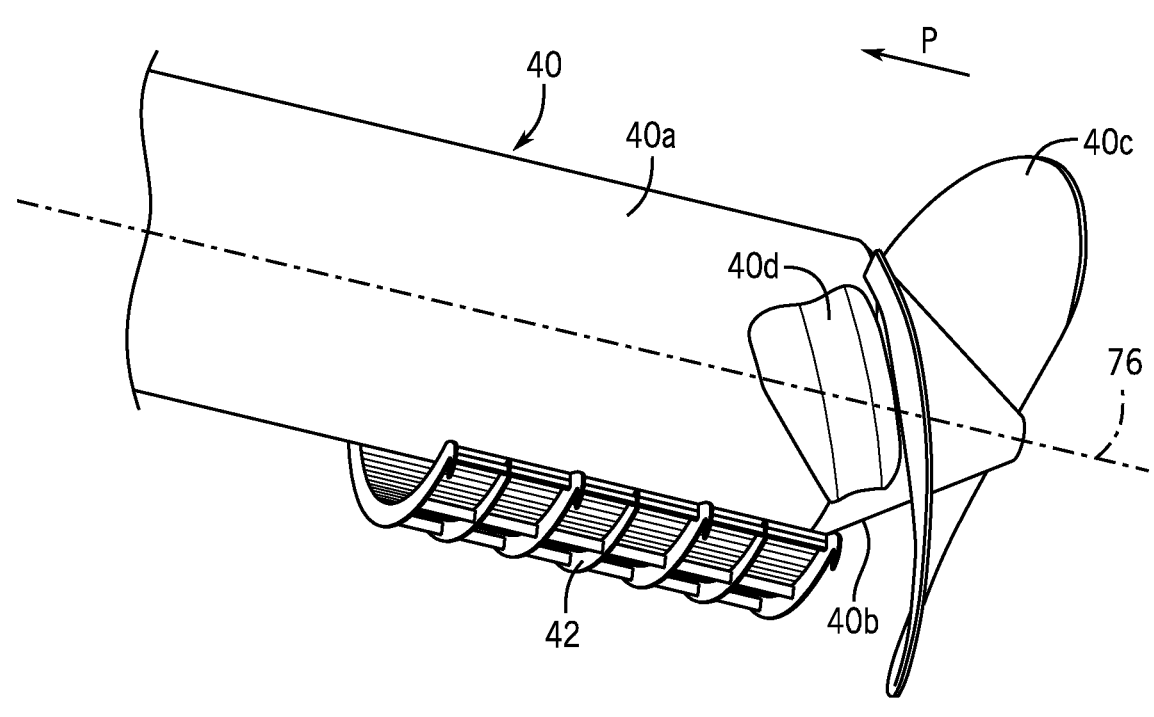
Figure 2D:
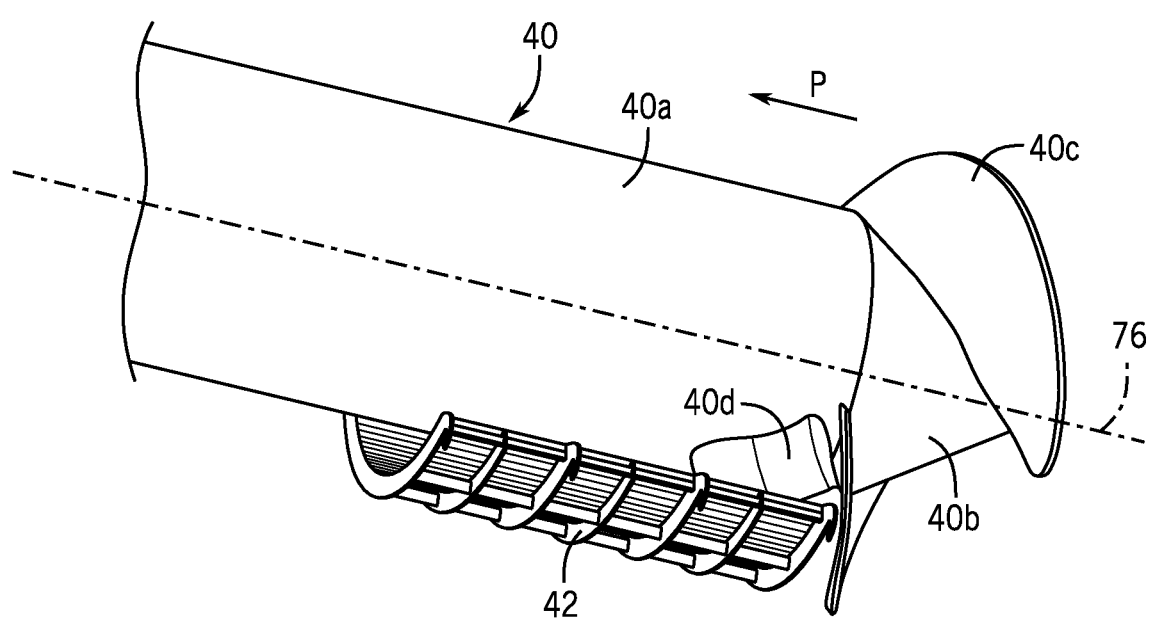

FIG. 1B shows a conventional rotor 40. The rotor 40 generally includes a main body 40a, a rotor transition surface 40b, and one or more impellers 40c. The rotor 40 is operated to rotate about a rotation axis 76. The main body 40a extends along the rotation axis 76, and is surrounded by a cage 78, which includes one or more perforated concaves 42. The cage 78 and main body 40a form a threshing chamber 80 between them, in which the crop material is threshed by rotation of the rotor 40. The rotor transition surface 40b is located at the forward end of the rotor 40 to receive incoming crop material. The transition surface 40b typically has a conical shape that tapers in size from a relatively small diameter at the feeder housing 20, to a relatively large diameter where it meets the main body. The impellers 40c typically are helical vanes that are oriented to drive crop material backwards along the rotor transition surface 40b to the main body 40a. The impellers may extend forward and/or aft of the transition surface 40b, or they may extend just along all or some of the length of the transition surface 40b along the rotation axis 76. The upstream end of the rotor cage 78 begins at a rotor cage inlet 78a, and to which the feeder housing 20 is connected by a housing transition surface 20a. The housing transition surface reduces in cross-sectional size, as viewed along the rotation axis 76, along the processing direction P.

As indicated above, the inventors have found that conventional rotors 40 can suffer from reduced efficiency as impeller 40c pulls the crop mat from the feeder housing 20 to the threshing chamber 80. In particular, the loaded side of the rotor 40 (i.e., the side facing downstream in the processing direction towards the main body 40a) generates pressure on the crop mat, which can require additional torque to rotate the rotor 40, and can lead to reduced threshing efficiency as the densified crop material passes through the threshing chamber 80. The inventors have determined that the foregoing inefficiencies are expected to be mitigated by providing the rotor 40 with one or more flutes 40d, such as those shown in FIGS. 2A-2D, to provide additional volume for the incoming crop mat to occupy as it moves from the loaded side of the impeller 40c to the threshing chamber 80.

FIGS. 2A-2D illustrate an exemplary rotor 40, along with a perforated concave 42 to pass separated grain from crop material moving along the processing direction P. Each figure shows the rotor 40 at a different sequential rotational position about the rotation axis 76. In normal operation, the rotor 40 rotates such that the near side in the view moves down, and the opposite side moves up (i.e., counterclockwise as viewed along the rotation axis 76 in the processing direction P). The rotor 40 has a main body 40a that extends along the rotation axis 76 in the processing direction P from a front main body end 40a' to a rear main body end 40a" (the rear main body end 40a" is illustrated schematically in FIG. 2A). The main body 40a may be cylindrical, or have other shapes. For example, the main body 40a may be elliptical or have stepped regions of various diameters. The main body 40a and the rotor cage 78 (including the concave(s) 42) define a threshing chamber 80 between them (see FIG. 1B). The shapes and dimensions of the main body 40a, cage 78 and concaves 42 may vary to provide different grain threshing functionality, as known in the art.

A rotor transition surface 40b extends opposite to the processing direction P from the front end 40a' of the main body 40a. The rotor transition surface 40b is tapered to decrease in cross-sectional size, as viewed along the rotation axis 76, as the rotor transition surface 40b increases in distance away from the main body 40a. The rotor transition surface 40b may be conical, or have other shapes (e.g., a bulged or pinched conical shape).

At least one impeller 40c extends from the rotor transition surface 40b, generally in a direction away from the rotation axis 76. In this example, there are two impellers 40c, each of which is shaped as a helical vane. The impellers 40c are configured to move the crop material along the processing direction P towards the main body 40a as the rotor 40 turns around the rotation axis 76. The impellers 40c may extend the full length of the rotor transition surface 40c along the rotation axis 76, and may extend to overlap some of the main body 40a. Other alternatives and embodiments will be apparent to persons of ordinary skill in the art in view of the present disclosure.

The rotor transition surface 40c and main body 40a includes one or more flutes 40d (i.e., depressions that extend inward towards the rotation axis 76). In this example, there is a single flute 40d located downstream of each impeller 40c, but more or fewer flutes 40d may be provided. The flutes 40d may have a variety of different shapes. For example, in the shown embodiment, each flute 40d has a helical shape that corresponds to the helical shape of the adjacent impeller 40c (i.e., extending along the same helical pitch). Some or all of each flute 40d may be located directly adjacent to the root of the respective impeller 40c, so that the upstream end of the flute 40d effectively forms a radially-extending inward continuation of the downstream face of the impeller 40c, but this is not strictly required.

The flutes 40d may be formed by any suitable construction method. For example, the flutes 40d may be formed by cutting out a portion of an existing rotor 40, inserting a filler having the desired flute geometry, and welding the filler in place. In other cases, the flutes 40d may be formed by shaping a continuous section of the metal that otherwise forms the main body 40a and/or rotor transition surface 40c into the desired shape. Other alternatives and embodiments will be apparent to persons of ordinary skill in the art in view of the present disclosure.

The operation of an exemplary thresher including a rotor 40 such as shown in FIGS. 2A-2D is illustrated in FIGS. 3A-3E. These figures show a rotor 40 mounted within a cage 78 and concave 42 to form a threshing chamber 80. The rotor cage inlet 78 is connected to the feeder housing 20 by a housing transition surface 20a that reduces in cross-sectional size, as viewed along the rotation axis 76, along the processing direction P. The impeller 40c is located, at least in part, radially between the housing transition surface 20a and the rotor transition surface 40b.

FIGS. 3A-3E show the rotor 40 in a sequence of rotational positions about the rotation axis 76 to illustrate how the impeller 40c operates as a helical ramp to move crop material in the processing direction P towards the threshing chamber 80. It will be understood that FIGS. 3A-3E show only the segment of the impeller 40c located in the plane of the page at that particular rotation angle of the rotor 40, and remaining portions of the impeller 40c that extend helically from the shown segment are not illustrated. Also, FIGS. 3A-3E show a rotor 40 having two impellers 40c and two corresponding flutes 40d, but more or fewer impellers 40c and flutes 40d may be used.

As shown in FIGS. 3A-3E, the impeller 40c drives the crop material back by reducing the volume of space defined between the threshing chamber 80, the downstream side of the impeller 40d, the rotor transition surface 40b and the housing transition surface 20a. However, the flute 40d provides a recessed flute volume V (see FIG. 4) in the rotor transition surface 40b and main body 40a into which the crop material can move, to thereby reduce the compression rate and pressure increase of the crop material. Thus, as the crop material moves between the converging walls of the rotor transition surface 40b and housing transition surface 20a, and approaches and enters the relatively narrow space between the cage 78 and the main body 40a, the flute 40d provides a flute volume V to receive some of the crop material, and thereby delay full compression until the crop material passes the end of the flute 40d along the processing direction P. This delay is expected to improve threshing efficiency by, for example, improving the condition of the crop material as it enters the threshing chamber 80 (e.g., by reducing the size and/or quantity of highly compressed clumps and more evenly distribute the crop material), and/or reducing operating power requirements.

Figure 4:
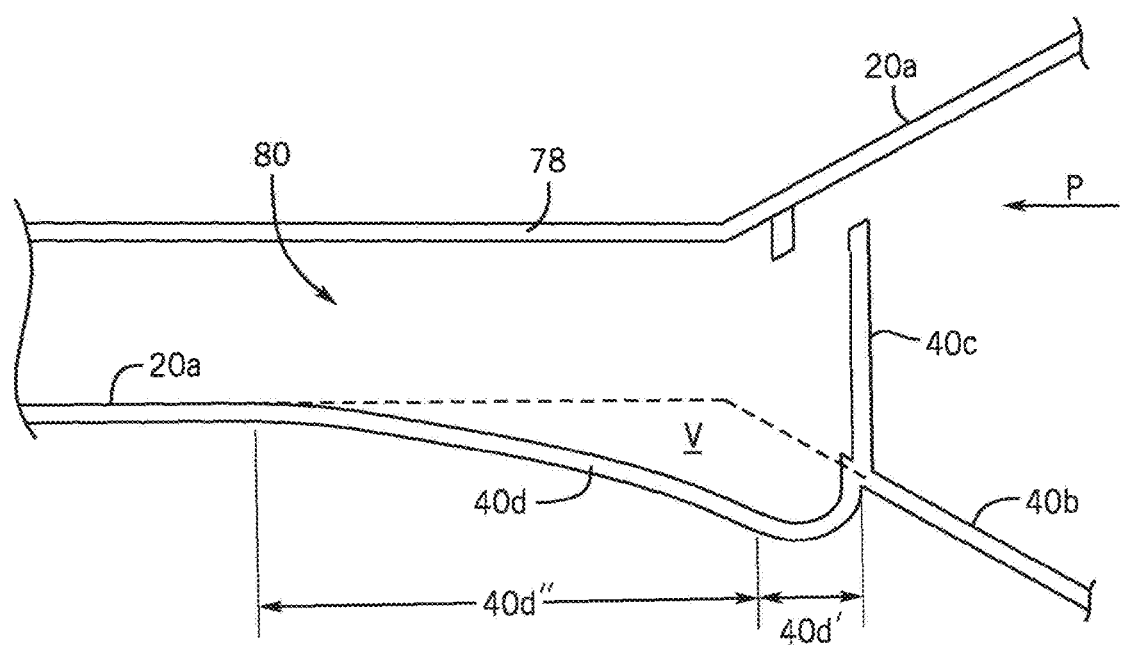
FIG. 4 is a cross-section side view of details of the thresher of FIGS. 3A-3E.

The flute 40d may have any suitable geometry to provide a flute volume V to receive and delay full compression of crop material. For example, FIG. 4 shows a flute 40d having a concave surface 40d' extending in the processing direction P from a leading edge of the flute 40d. In this case, the leading edge of the flute 40d is at the root of the impeller 40c, but this is not strictly required. The flute 40d also has a convex transition surface 40d" extending in in the processing direction P from the concave surface 40d' to the main body 40a. The convex transition surface 40d" may blend smoothly into the surface (e.g., cylindrical surface) of the main body 40a, but this is not required in all embodiments. Also, in the shown embodiment, the flute 40d overlaps at least a portion of the housing transition surface 20a and the rotor cage 78 along the rotation axis 76 (i.e., the flute 40d passes through the rotor cage inlet 78a), but this is not required in all embodiments.

The flute 40d in FIG. 4 is expected to provide certain benefits. First, the concave surface 40d' is hooked towards the processing direction P so as to generate an axial force vector to help drive the crop material along the processing direction P. Second, the convex transition surface 40d" smooths the transition from the flute 40d to the main body 40a as compared to a surface that is linear or convex (i.e., the surfaces are parallel to each other or at a relatively small angle to each other relative to the processing direction), which help prevent the development of a pressure spike at the end of the flute 40d.

Figure 3A:
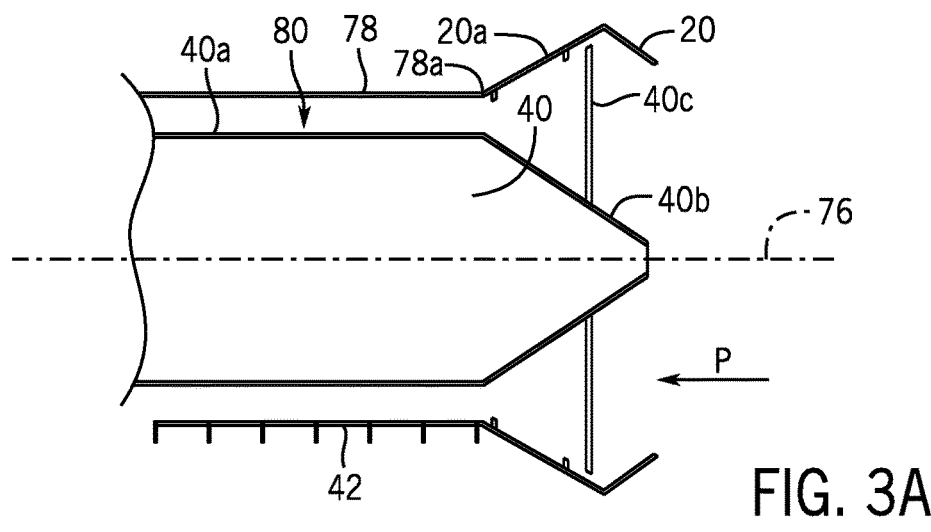
FIGS. 3A-3E are cross-section side views of an exemplary thresher, shown with the rotor in five different rotational positions.
Figure 3B:
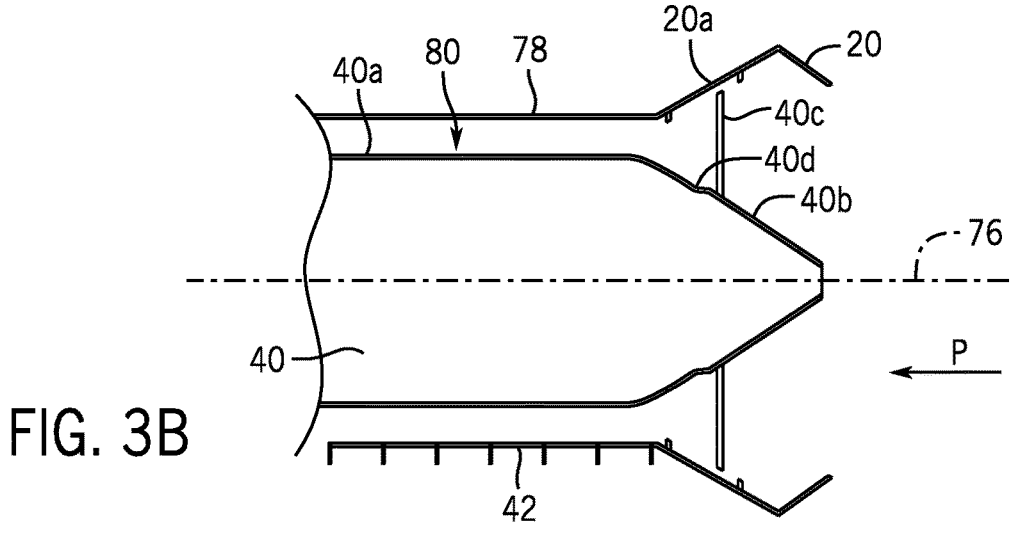
Figure 3C:
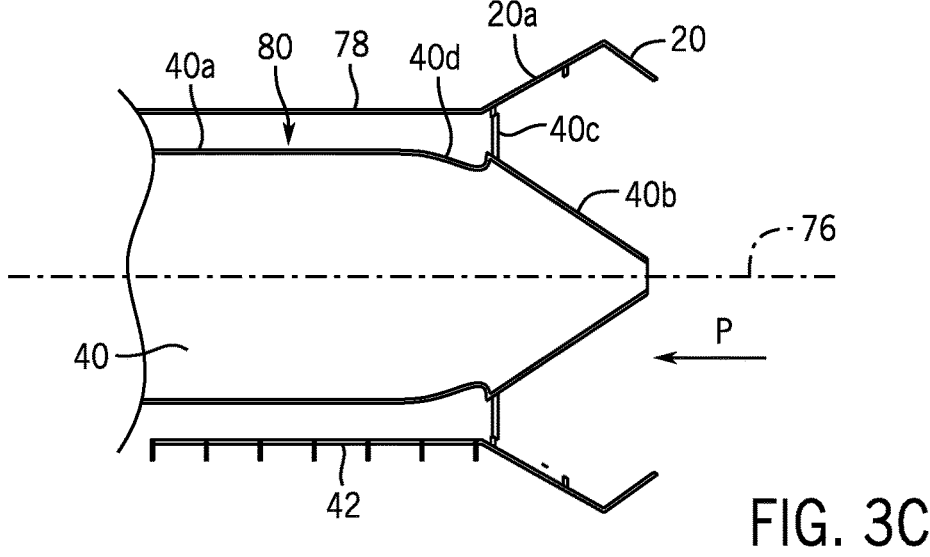
Figure 3D:
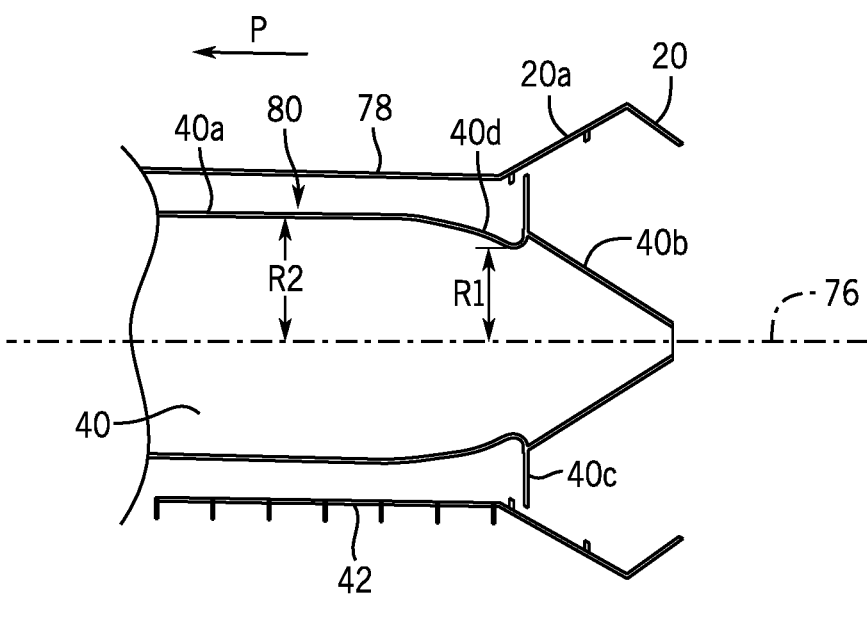
Figure 3E:
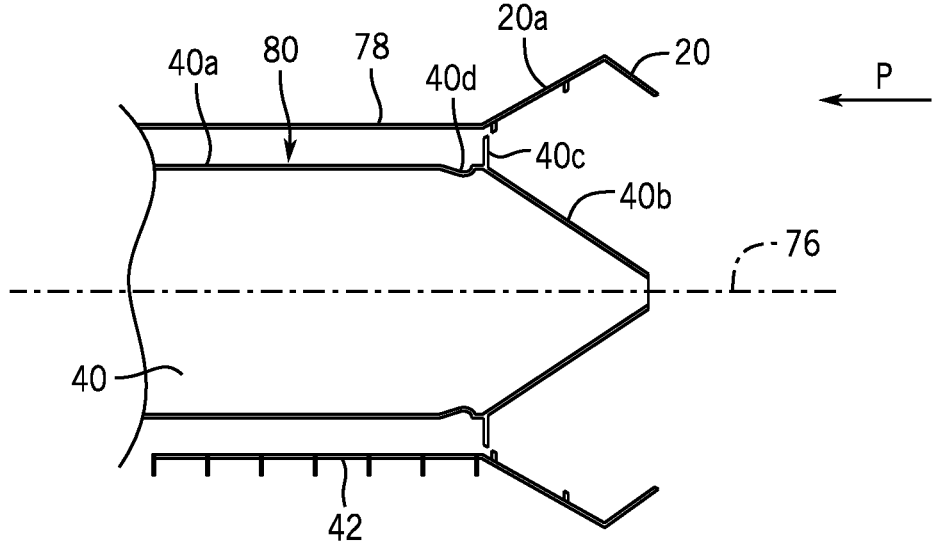
Figure 5:
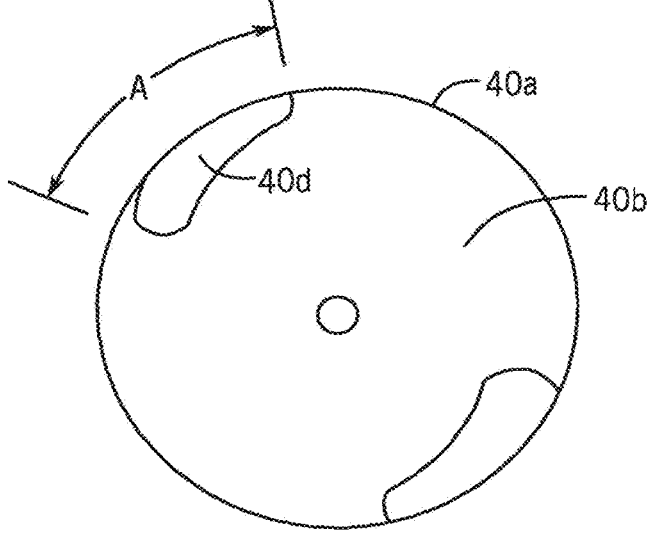
FIG. 5 is a front view of another embodiment of a thresher rotor.

FIG. 3D and FIG. 5 show additional features of exemplary embodiments. FIG. 3D shows a relative depth of the flute 40d into the rotor transition surface 40c and/or main body 40*a*. In this case, the relative depth is defined by ratio
of the minimum radius R1 of the rotor 40 at the flute 40*d*,
and the maximum radius R1 of the main body 40*a* of the
rotor 40. The ration of R1 to R2 may be, for example, 80%
or less (i.e., the minimum radius R1 is 80% or less than the
maximum radius R2).

FIG. 5 shows the rotor 40 without the impeller 40*c*, as
viewed in the processing direction P along the rotation axis
76. Here, it can be seen that each flute 40*d* extends around
the rotor 40 through a flute angle A. In this example, the flute
angle A preferably is at least 45°, but other angles may be
used.

Various aspects of the flute 40*d* can be modified to alter
the crop threshing efficiency. For example, the flute volume
V, flute angle A, depth of the flute 40*d* into the rotor
transition surface 40*b* and main body 40*a*, and the length,
width and shape of the flute 40*d*, can be modified (e.g., based
on computational methods or empirical evidence or other
studies) to obtain different results. Flutes 40*d* that are
relatively small in any dimension might be relatively inef-
fective at reducing crop compression, whereas flutes 40*d*
that are relatively large in one or more dimensions might
alleviate crop compression, but reduce the overall efficiency
of the threshing process by presenting a large volume in
which the crop material is not in close proximity to the cage
78 and concave 42. Nevertheless, suitable constructions will
be readily apparent or determinable through routine experi-
mentation by persons of ordinary skill in the art in view of
the teachings provided herein.

It will be appreciated that embodiments may be used in
agricultural threshers of various forms, including single
thresher machines, twin threshers, and so on. It will also be
appreciated that embodiments may be provided in a variety
of forms and states of construction. For example, one
embodiment may comprise a rotor 40 that is provided for
replacement into an existing combine threshing system. As
another example, an embodiment may be provide as an
agricultural thresher assembly having a rotor 40 and a rotor
cage 78. As another example, an embodiment may be
provided as an agricultural combine main unit having a
chassis 12, feeder housing 20, and thresher comprising a
rotor 40 and rotor cage 78. Other alternatives and embodi-
ments will be apparent to persons of ordinary skill in the art
in view of the present disclosure.

The present disclosure describes a number of inventive
features and/or combinations of features that may be used
alone or in combination with each other or in combination
with other technologies. Such features may be used in any
useful combination, and the appearance of a particular
feature in combination with another particular feature in the
embodiments is not intended to suggest that such features
cannot be used in alternative combinations with other fea-
tures. The embodiments described herein are all exemplary,
and are not intended to limit the scope of the claims. It will
be appreciated that various aspects of the embodiments
described herein may be provided as component parts or as
subassemblies. It will also be appreciated that the inventions
described herein can be modified and adapted in various
ways, and all such modifications and adaptations are
intended to be included in the scope of this disclosure and
the appended claims.

It will also be understood that the description herein and
the claims describe features that may be combined with
other features not specifically described. Also, features iden-
tified in the singular or by a specific number are not intended to be limited to a single features or the described number of
features unless specifically recited as being present only in
the specified quantity.

The invention claimed is:

1. An agricultural thresher rotor comprising:
a main body extending along a rotation axis in a process-
ing direction from a front main body end to a rear main
body end;
a rotor transition surface extending from the front main
body end and tapered to decrease in cross-sectional
size, as viewed along the rotation axis, away from the
main body; and
at least one impeller extending away from the rotation
axis from the rotor transition surface that moves crop
material towards the main body upon rotation of the
rotor about the rotation axis;
wherein the rotor transition surface and the main body
comprise at least one flute located downstream of the at
least one impeller, defining a recessed flute volume in
the rotor transition surface and the main body; and
wherein the at least one impeller comprises a helical vane
and the at least one flute comprises a helical recess
corresponding to the helical vane.
2. The agricultural thresher rotor according to claim 1,
wherein the main body is cylindrical.
3. The agricultural thresher rotor according to claim 1,
wherein the rotor transition surface is conical.
4. The agricultural thresher rotor according to claim 1,
wherein the at least one flute is directly adjacent to the at
least one impeller.
5. The agricultural thresher rotor according to claim 1,
wherein the at least one flute comprises a concave surface
extending in the processing direction from a leading edge of
the at least one flute.
6. The agricultural thresher rotor according to claim 5,
wherein the at least one flute comprises a convex transition
surface extending in in the processing direction from the
concave surface to the main body.
7. The agricultural thresher rotor according to claim 1,
wherein the at least one flute extends through an angle
around the rotation axis of at least 45°.
8. The agricultural thresher rotor according to claim 1,
wherein the minimum radius of the rotor at the at least one
flute is 80% or less than the maximum radius of the main
body.
9. An agricultural thresher comprising:
a rotor cage having a rotor cage inlet; and
a rotor mounted within the rotor cage that rotates relative
to the rotor cage about a rotation axis, the rotor com-
prising:
a main body extending along the rotation axis in a
processing direction from a front main body end to a
rear main body end, wherein the main body is located
inside the rotor cage, and the main body and the rotor
cage define a threshing chamber;
a rotor transition surface extending from the front main
body end and tapered to decrease in cross-sectional size
away from the main body; and
at least one impeller extending away from the rotation
axis from the rotor transition surface that moves crop
material towards the rotor cage inlet and the main body
upon rotation of the rotor about the rotation axis;
wherein the rotor transition surface and the main body
comprise at least one flute located downstream of the at
least one impeller, defining a recessed flute volume in
the rotor transition surface and the main body; and wherein the at least one impeller comprises a helical vane and the at least one flute comprises a helical recess corresponding to the helical vane.

10. The agricultural thresher of claim 9, further comprising a feeder housing positioned at the rotor cage inlet;

wherein the feeder housing comprises a housing transition surface that reduces in cross-sectional size, as viewed along the rotation axis, along the processing direction.

11. The agricultural thresher of claim 10, wherein the housing transition surface surrounds the rotor transition surface, and the at least one impeller is located radially between the housing transition surface and the rotor transition surface.

12. The agricultural thresher of claim 10, wherein the at least one flute overlaps at least a portion of the housing transition surface and the rotor cage along the rotation axis.

13. An agricultural combine comprising:

a chassis that moves along a surface;

a feeder housing; and a thresher comprising:

a rotor cage having a rotor cage inlet in communication with the feeder housing; and a rotor mounted within the rotor cage that rotates relative to the rotor cage about a rotation axis, the rotor comprising:

a main body extending along the rotation axis in a processing direction from a front main body end to a rear main body end, wherein the main body is located inside the rotor cage and the main body and the rotor cage define a threshing chamber;

a rotor transition surface extending from the front main body end and tapered to decrease in cross-sectional size away from the main body; and at least one impeller extending away from the rotation axis from the rotor transition surface that moves crop material from the feeder housing towards the rotor cage inlet and the main body upon rotation of the rotor about the rotation axis;

wherein the rotor transition surface and the main body comprise at least one flute located downstream of the at least one impeller, defining a recessed flute volume in the rotor transition surface and the main body; and wherein the at least one impeller comprises a helical vane and the at least one flute comprises a helical recess corresponding to the helical vane.

14. The agricultural combine of claim 13, wherein the feeder housing comprises a housing transition surface that reduces in cross-sectional size, as viewed along the rotation axis, along the processing direction to join the rotor cage inlet.

*   *   *   *   *